July 27, 1965 W. C. ETHERIDGE 3,196,807
CARRIER TRANSFER BETWEEN CONVEYOR POWER LINES
Filed June 1, 1964 10 Sheets-Sheet 1

INVENTOR.
WALTER C. ETHERIDGE
BY Farley, Forster & Farley
ATTORNEYS

INVENTOR.
WALTER C. ETHERIDGE
BY
Farley, Forster & Farley
ATTORNEYS

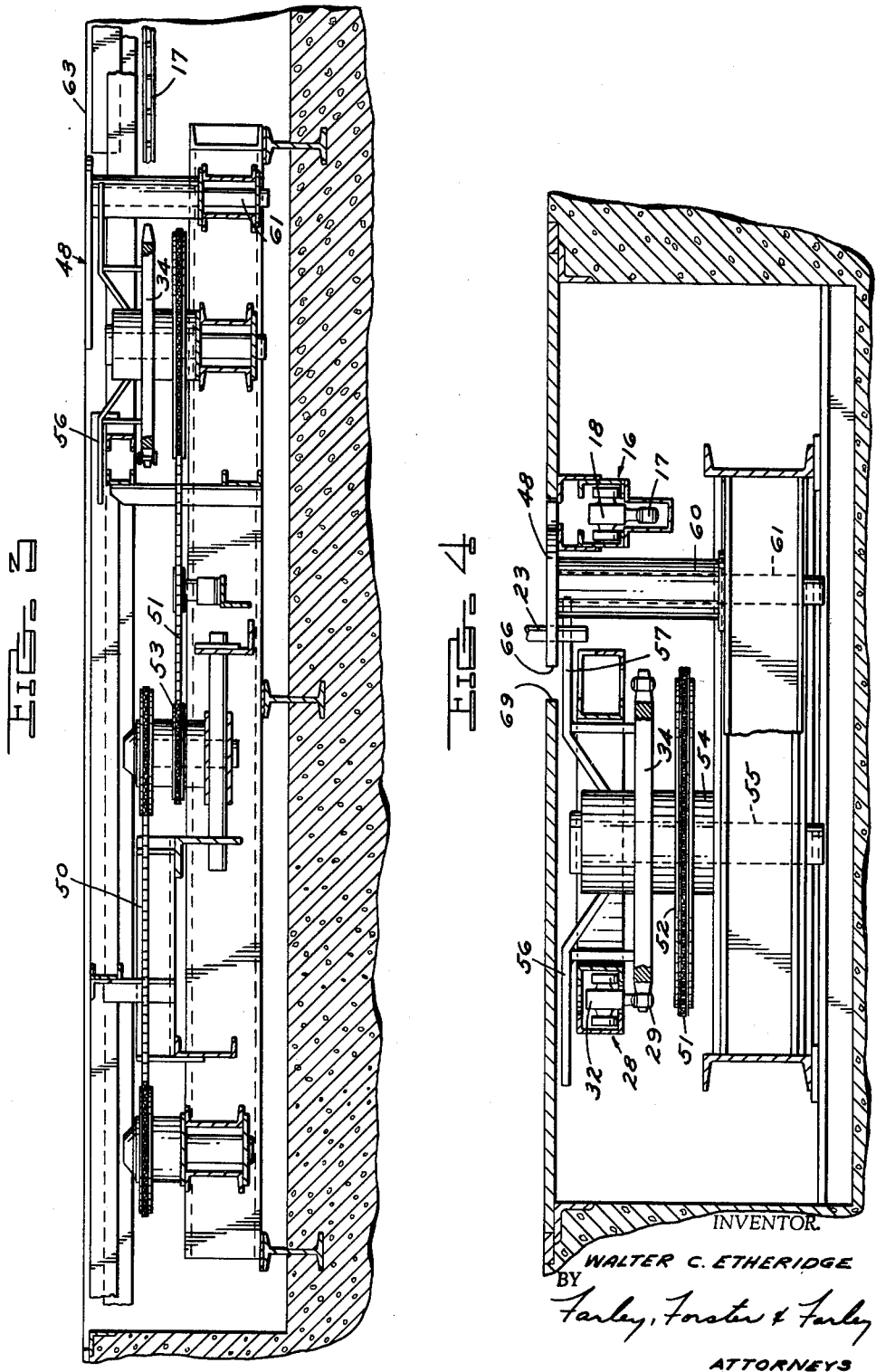

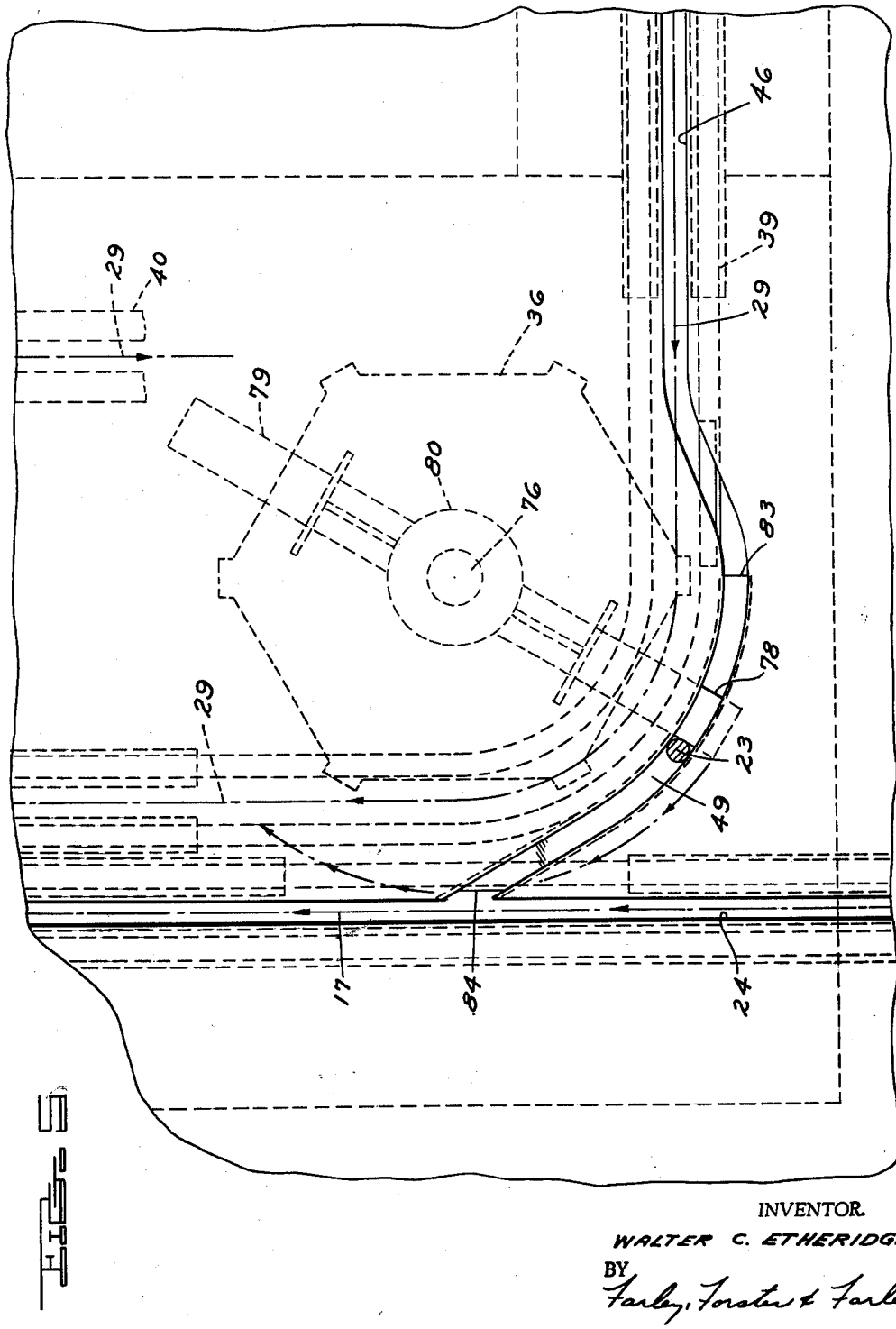

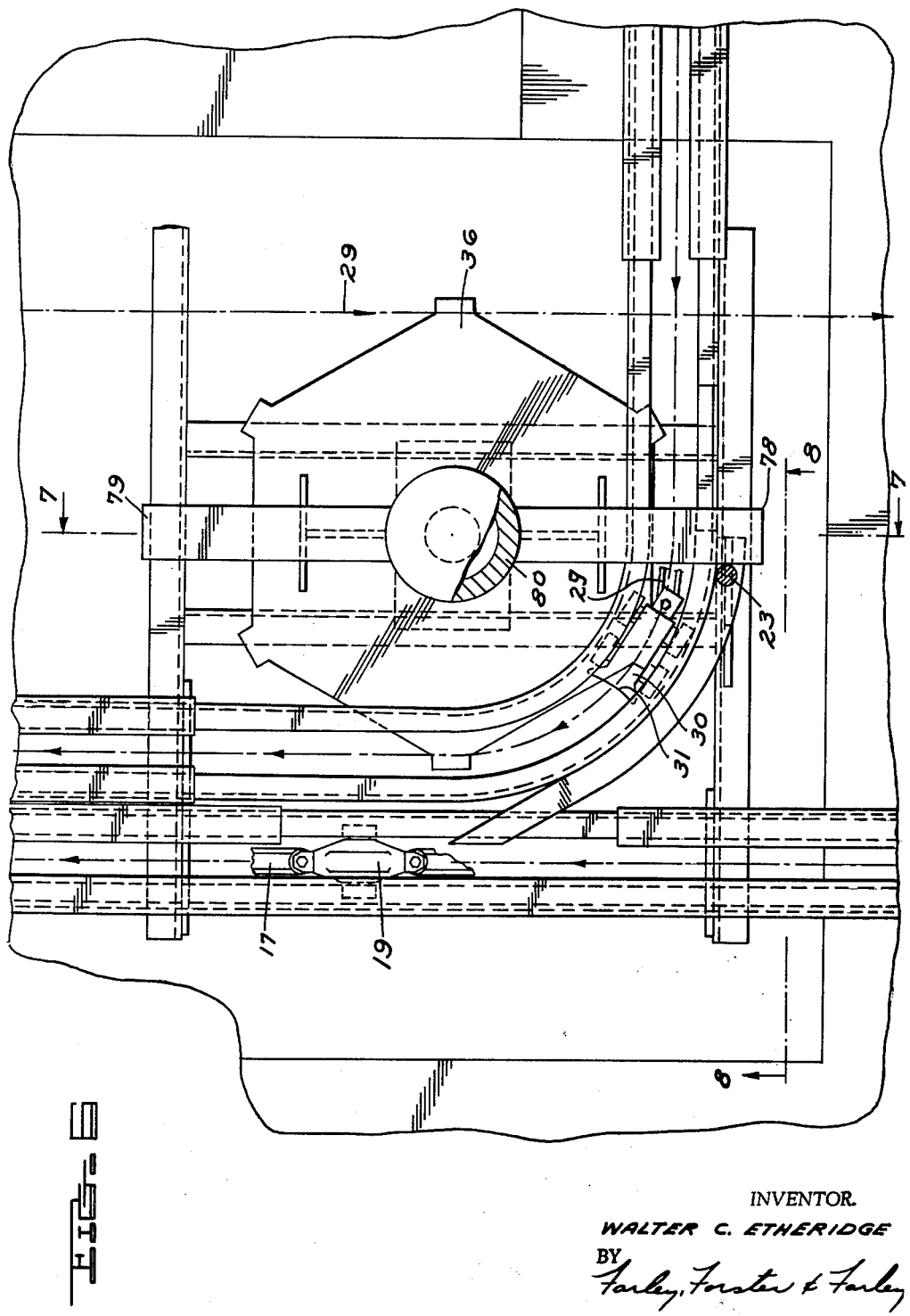

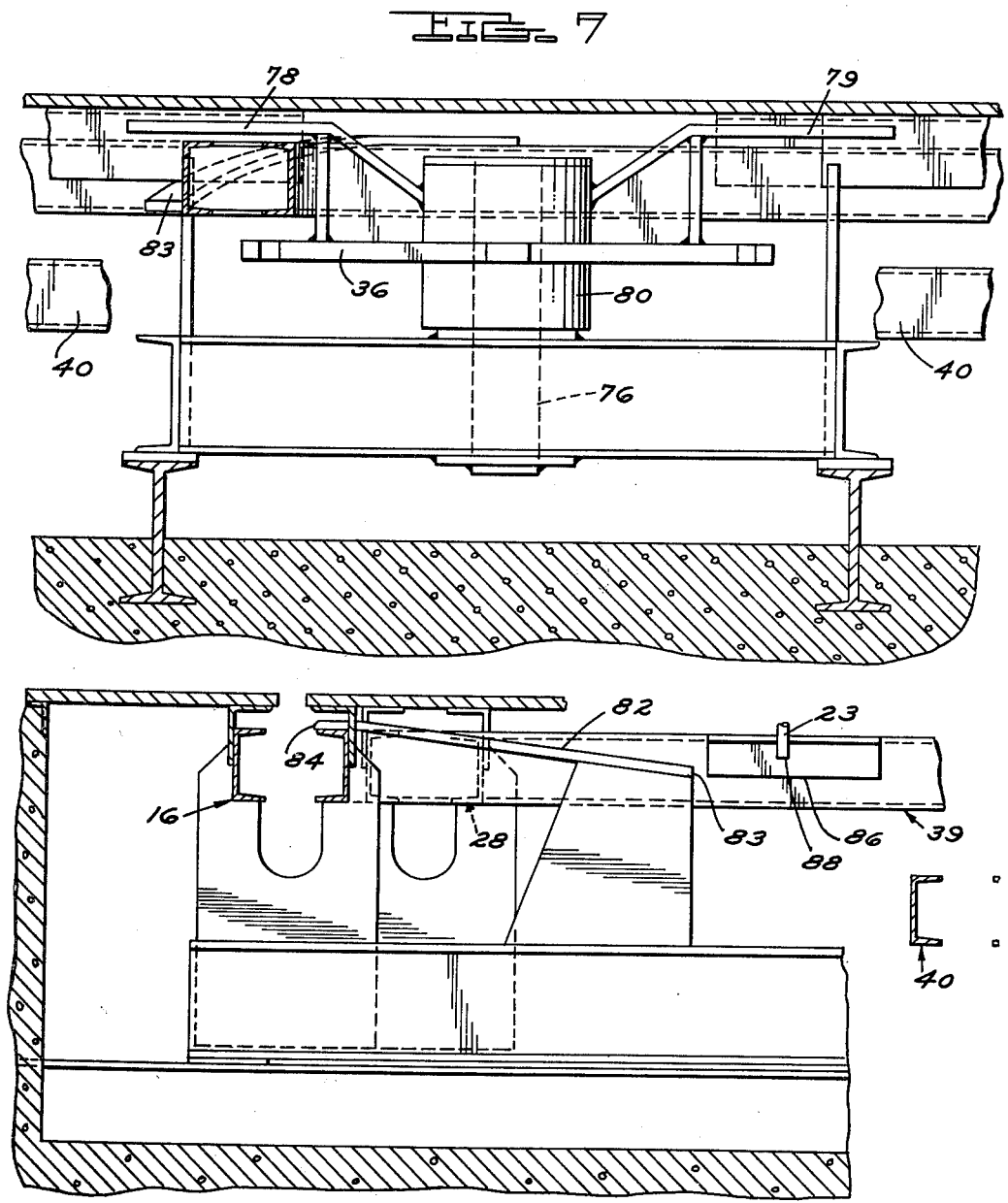

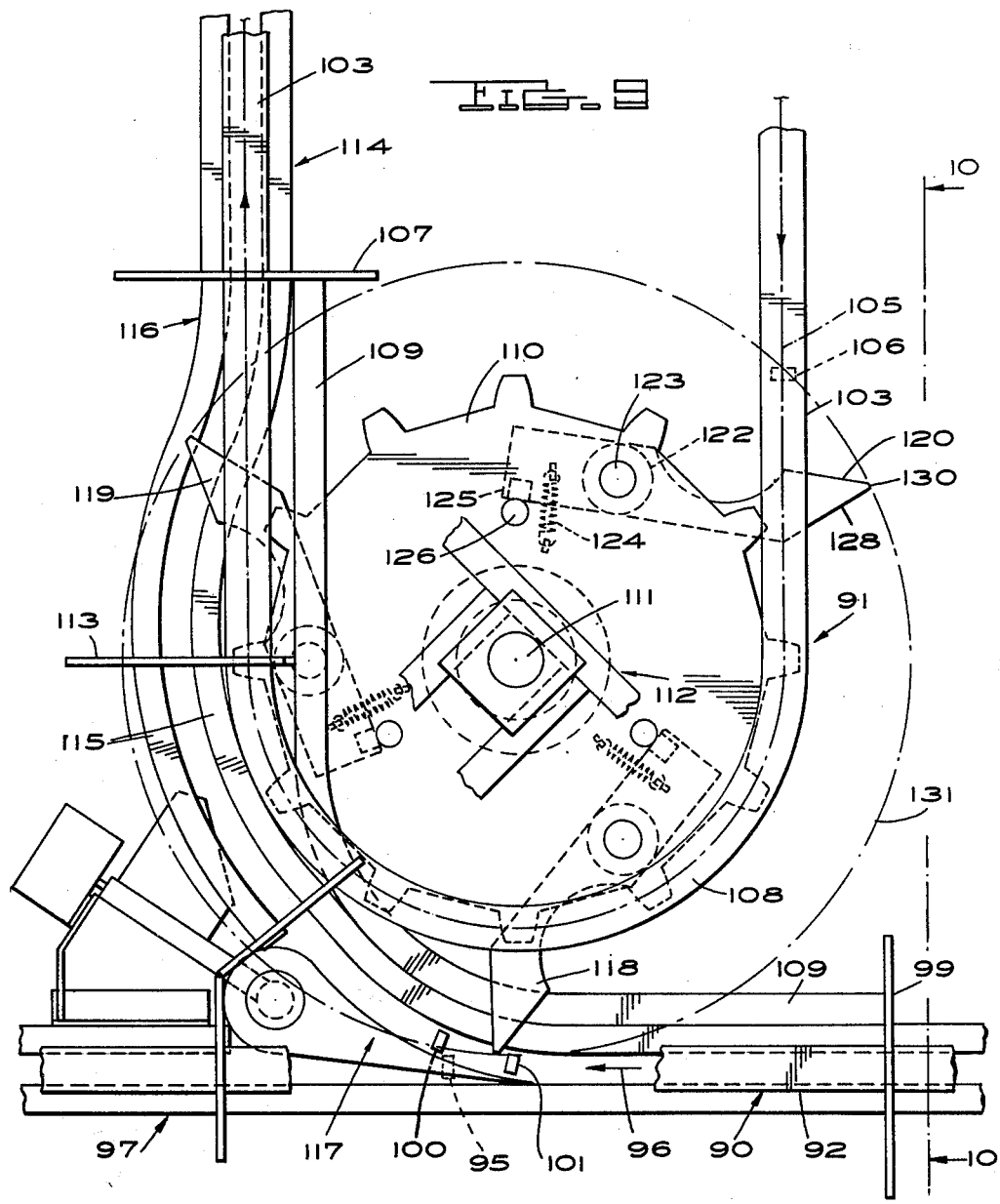

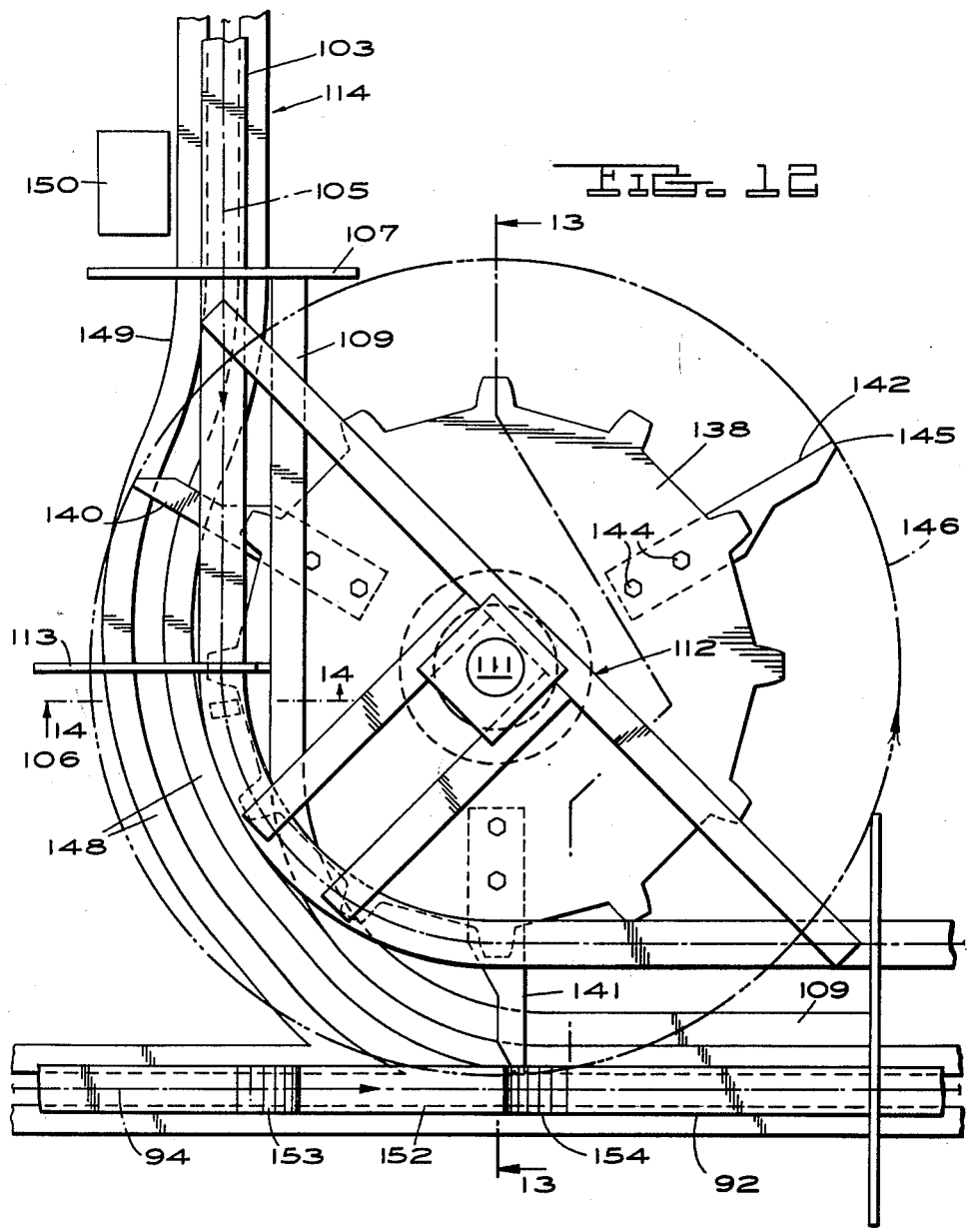

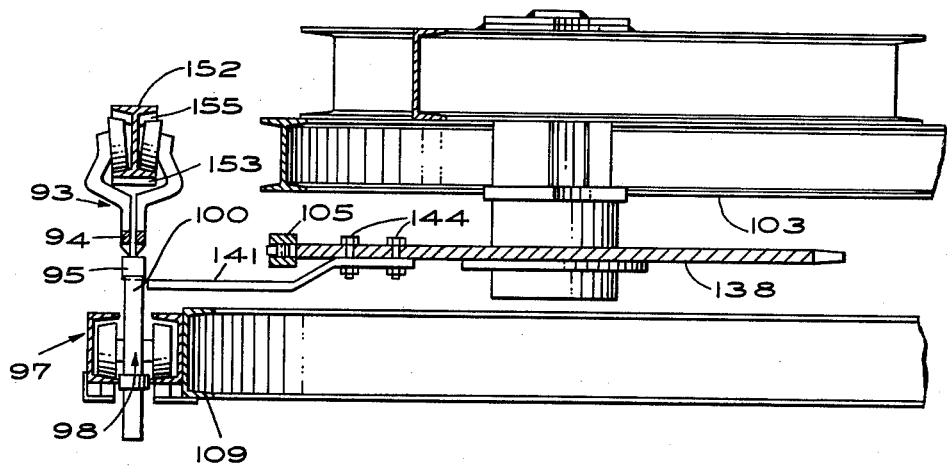
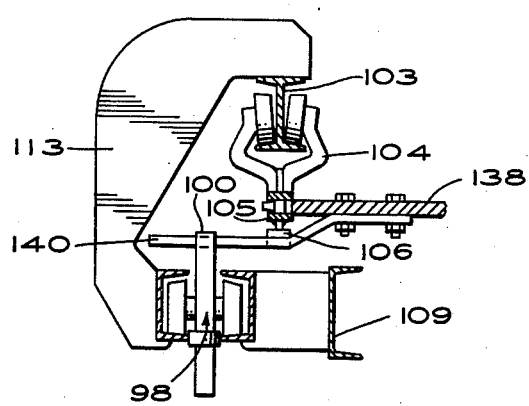

United States Patent Office 3,196,807
Patented July 27, 1965

3,196,807
CARRIER TRANSFER BETWEEN CONVEYOR
POWER LINES
Walter Clayton Etheridge, 6730 Indianwood Trail,
Birmingham, Mich.
Filed June 1, 1964, Ser. No. 377,449
15 Claims. (Cl. 104—172)

This application is a continuation-in-part of my prior application Serial No. 267,662, filed March 25, 1963.

This invention relates to improvements in the construction of conveyors having main and branch lines with provision for transferring a carrier from one line to another, and has particular application to conveyors of the floor truck tow line type and the overhead power-and-free type.

In floor truck tow line conveyors, the carriers are each provided with a driven member or tow pin which is vertically movable into the path of travel of a pusher or a propelling line, the propelling line usually comprising an endless chain supported by trolleys from a trackway with the pushers forming part of the construction of at least certain of the trolleys. So-called "sub-floor" installations have the propelling line installed beneath a supporting floor on which the trucks travel and the tow pins is lowered through a guide slot in the floor for engagement by a pusher; in the "overhead" type of installation, the floor trucks are each equipped with a tow mast on which the tow pin is carried and the propelling line is mounted above the floor.

Conventional overhead power-and-free conveyors include a carrier supporting track and an adjacent power track on which the trolleys which carry the endless propelling chain and pushers are mounted, the pushers extending toward the carrier supporting tracks so as to engage a driven member on a carrier.

Hence all of the foregoing conveyors include a propelling or power line equipped with pushers for engaging a driven member on a carrier which travels on a support separate from the power line, either a floor or a track. In all these conveyors, it is frequently desirable to employ at least two propelling lines, which for convenience will be referred to as main and branch propelling lines, and to positively transfer a carrier by power from one line to another.

The general object of the present invention is to provide constructions for accomplishing such a transfer which are applicable to conveyors of both the floor truck and power-and-free type, and which accomplish a positive transfer of a carrier driven member from a main line to a branch line or vice versa whether movement of the main and branch line propelling members be synchronized or not synchronized.

The term "unloading transfer zone" will be employed to denote a transfer zone where a carrier is delivered from main line to a branch line; and, the term "loading transfer zone" will be used to describe a zone in which a carrier is delivered from a branch line to a main line.

According to the invention, a conveyor having main and branch lines each with an endless propelling member supported by trolleys on a trackway and pushers for engaging a driven member of a carrier travelling on a support adjacent the trackway, and means for transferring a carrier between the main and branch lines at a transfer zone, is characterized in that a transfer arm is mounted for rotation on a vertical axis at the transfer zone, means for continuously driving the transfer arm from the propelling member of one of the main and branch lines so that the outer end of the transfer arm follows a horizontal circular path which is tangent to the path of travel of the main propelling member and which overlaps a portion of the path of travel of the branch propelling member, and guide members defining a connecting path of travel of a carrier driven member through the transfer zone from one line to the other, the end portions of this connecting path of travel overlapping the path of travel of pushers on the main and branch lines and the remaining portion of the connecting path of travel lying within the circular path of the transfer arm.

Other features and advantages will appear from the following description of the representative embodiments of the invention shown in the accompanying drawings in which:

FIGURE 3 is a sectional elevation taken as indicated by the line 3—3 of FIG. 2;

FIGURE 4 is an enlarged sectional elevation taken as indicated by the line 4—4 of FIG. 2;

FIGURE 5 is a plan view of the loading transfer zone from branch to main line;

FIGURE 6 is a view similar to FIG. 5 but with the floor plates removed;

Figure 10:
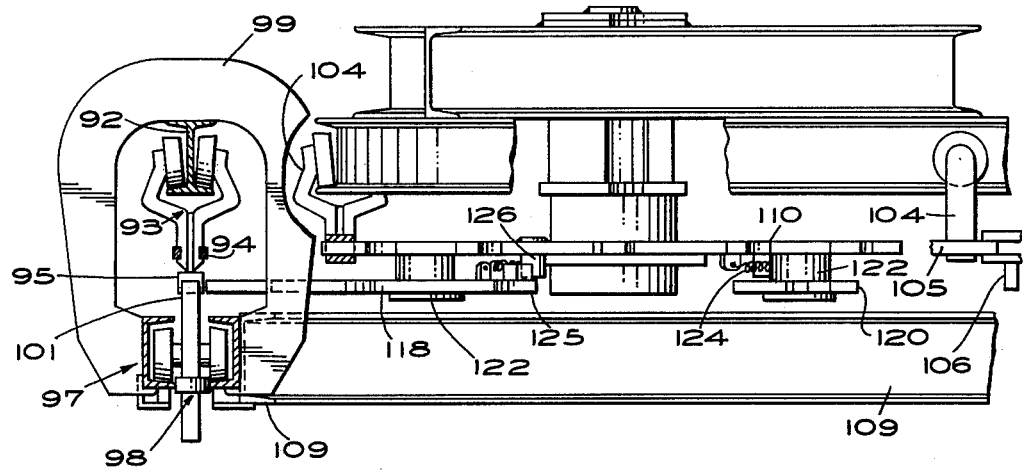
Figure 11:
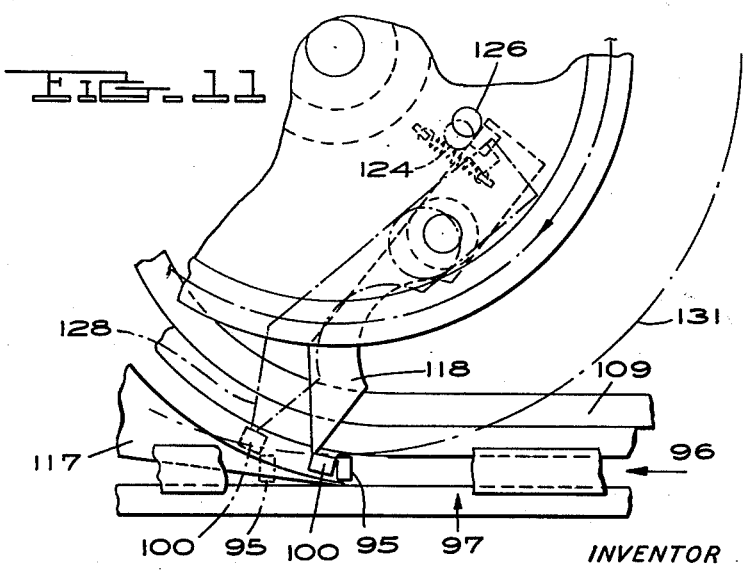

FIGURES 7 and 8 are enlarged sectional elevations taken as indicated by the lines 7—7 and 8—8 respectively of FIG. 6;

FIGURE 9 is a plan view of an unloading transfer zone of an overhead power-and-free conveyor;

FIGURE 10 is a sectional elevation of the structure shown in FIG. 9, taken as indicated by the line 10—10 thereon;

FIGURE 11 is a fragmentary plan view of the structure shown in FIG. 9;

FIGURE 12 is a plan view of a loading transfer zone for an overhead power-and-free conveyor;

FIGURE 13 is a sectional elevation taken as indicated by the line 13—13 of FIG. 12 and FIGURE 14 is a sectional elevation taken as indicated by the line 14—14 of FIG. 12.

Figure 1:
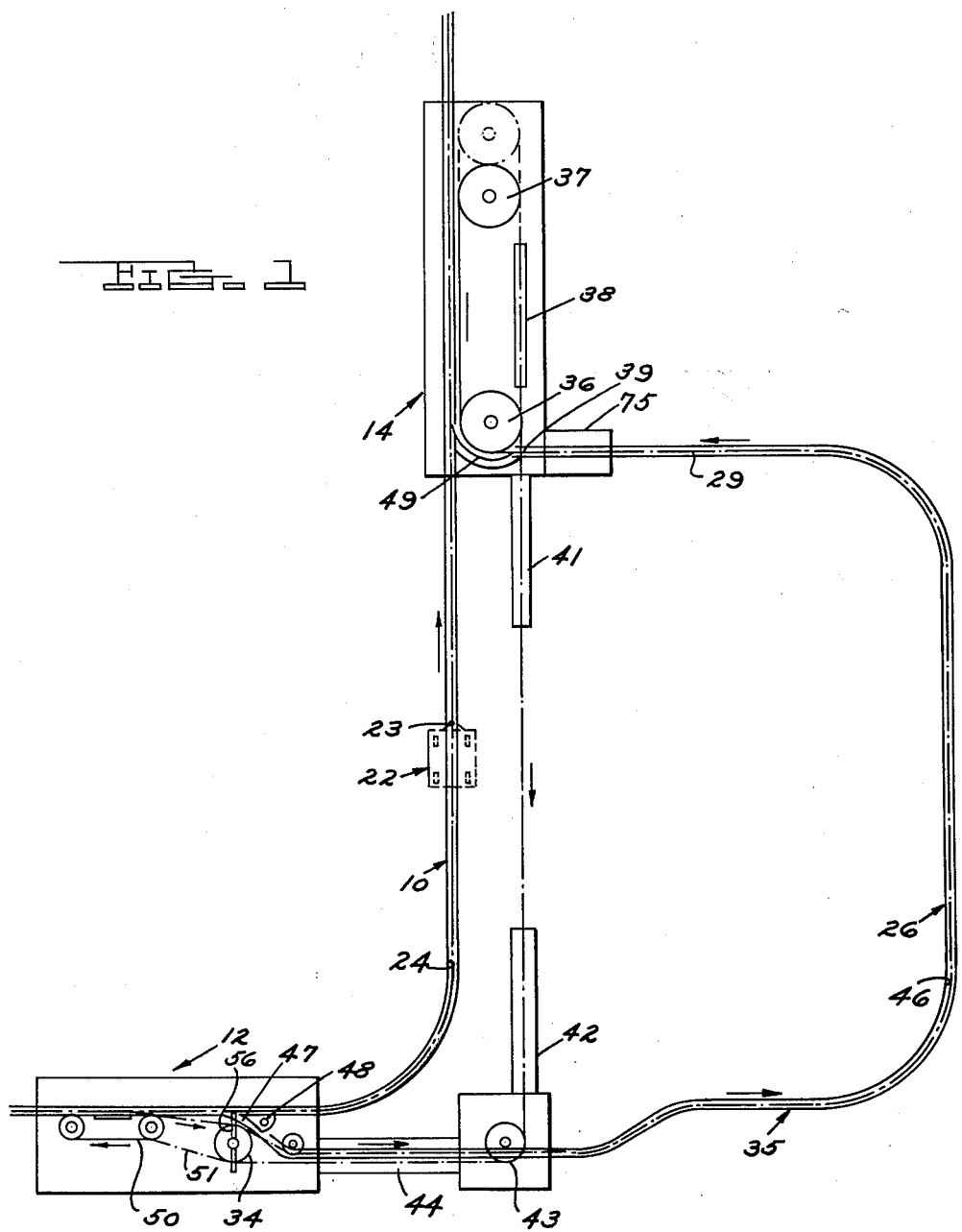
FIGURE 1 is a schematic plan view of a portion of a subfloor conveyor which includes a main line and a branch line with unloading and loading transfer zones between the two lines.

In FIG. 1, a portion of a main propelling line 10 is shown between an unloading transfer zone 12 and a loading transfer zone 14. Main line 10 includes, as best appears in FIGS. 2 and 4, a sub-floor trackway 16 formed by a pair of opposed channel members, and an endless propelling chain 17 supported from trolleys 18 and 19 which travel on the trackway. Trolleys 18 are equipped with a pusher 20 while trolleys 19 merely serve to support the chain 17. Wheeled floor trucks 22 (FIG. 1), of conventional construction, are each provided with a vertically movable driven member or tow pin 23 which is lowered into the path of travel of the pushers 20 through a guide slot 24 in the floor, vertically aligned with the path of travel of the chain.

Figure 2:
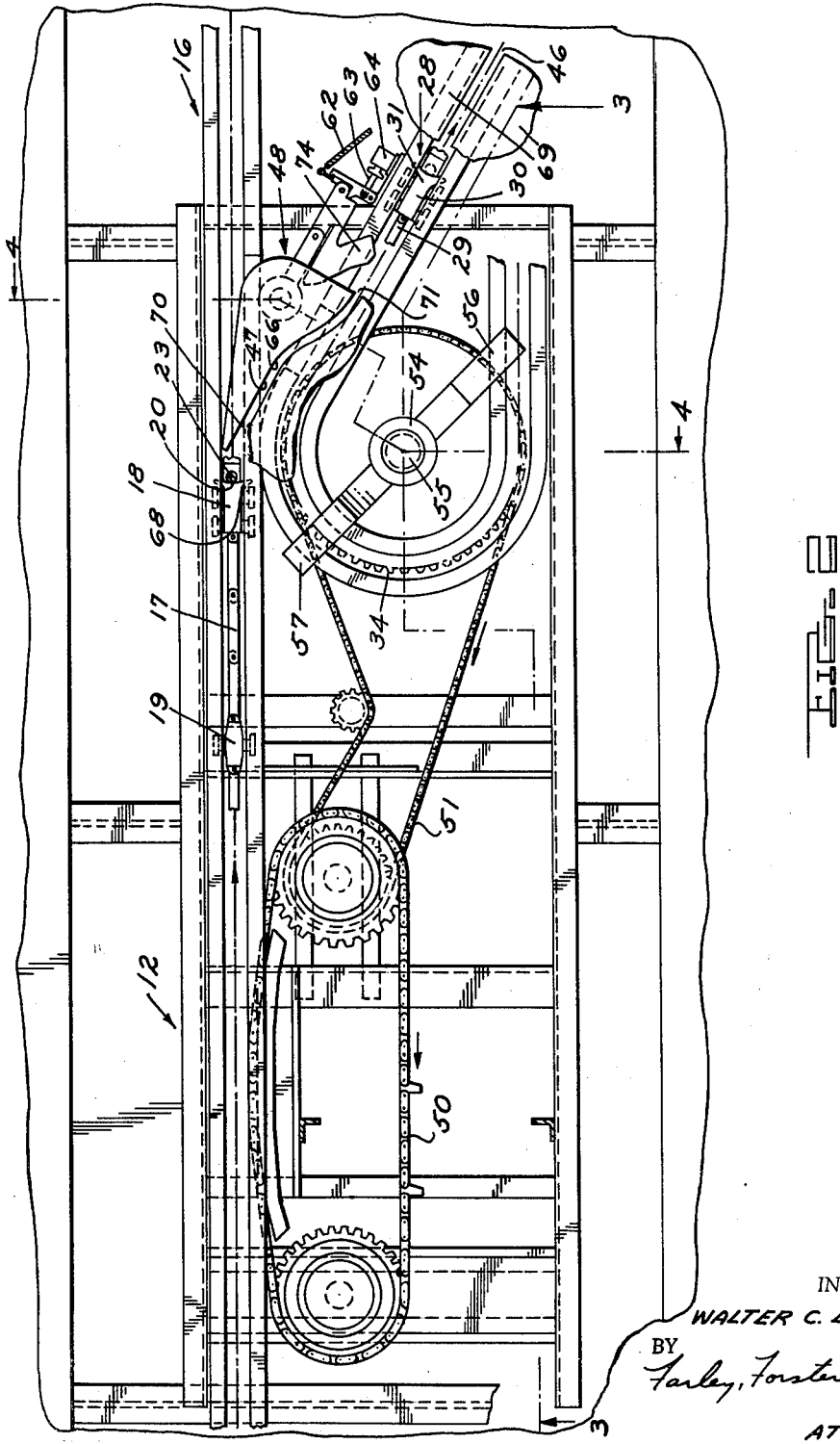
FIGURE 2 is a plan view of the unloading transfer zone from main to branch line with most of the carrier supporting floor plates removed.

A branch line 26 extends between the transfer zones 12 and 14, and as shown in FIGS. 2 and 4, is identical in construction with the main line including a double channel trackway 28, and an endless chain 29 supported from the trackway by trolleys 30 and 32, the trolleys 30 including a pusher 31. As shown in FIG. 1, the branch line chain 29 is trained about a driving sprocket 34 at the unloading transfer zone 12 and begins a forwarding run 35 to the loading transfer zone 14 where the branch line chain 29 extends about a guide sprocket 36 and a take-up sprocket 37 to begin a return run. Along the return run, the branch trackway descends on a section 38 to pass under the forwarding track portion 39 at a lower level 40 (FIGS. 7 and 8), ascends on section 41 to a normal level, descends on section 42 to pass around the guide sprocket 43 and ascends along section 44 to pass around the drive sprocket 34.

The branch line guide slot 46 only extends between the drive sprocket 34 and guide sprocket 36 above the forwarding run 35 of the branch propelling line, being joined to the main line guide slot 24 at the unloading transfer zone 12 by a connecting guide portion 47 formed in part by a deflector or switch 48, and at the loading transfer zone 14 by a connecting guide portion 49.

A conventional power take-off unit 50, driven from the main chain 17, drives the sprocket 34 through a chain 51 and associated secondary sprockets 52 and 53 as shown in FIGS 2–4. Drive sprocket 34 and secondary sprocket 52 are secured to a hub 54 mounted on a vertical shaft 55. Also secured to the hub 54 and to the face of the sprocket 34 are a pair of diametrically opposed transfer arms 56 and 57 which extend above and outwardly of the sprocket 34 and rotate with the sprocket 34 in a circular horizontal path having a radius greater than that of the sprocket. This circular path overlies a portion of the path of travel of the branch line and is almost tangent to the near side of the main line guide slot 24 and path of travel of the main chain 17. A transfer arm is positioned relative to a pusher 20 on the main line and a pusher 31 on the branch line so as to swing through the transfer zone in trailing relation to a main line pusher and leading relation to a branch line pusher.

Deflector 48 is supported on a collar 60 pivotally mounted on a vertical shaft 61. Deflector 48 is urged to branch line position by a spring 62 (FIG. 2) and held in main line position by a latch pin 63 which can be released by a solenoid 64.

When the deflector 48 is in branch line position as shown in FIG. 2, the tow pin 23 of an approaching carrier is intercepted and forward motion of the tow pin on a main line pusher 20 causes the tow pin to move laterally along the deflector face 66. Each main line pusher 20 preferably includes laterally extending wings 68 which project far enough to one side of the main line path of travel to overlap the circular path of travel of the transfer arms 56, 57. Thus, when a tow pin 23 moves along the deflector face 66 far enough to lose engagement with a main line pusher 20 it is within the circular path of travel of a transfer arm moving in slightly trailing relation with a main line pusher. The tow pin is then picked up by one of the transfer arms and advanced along the connecting guide path 47 between main and branch lines defined by the faces 66 of the deflector and adjacent floor plate 69 (FIG. 4). The adjacent sides of the main and branch line track structures are broken away at 70 and 71 (FIG. 2) respectively to form tow pin passages A diverted tow pin is advanced by a transfer arm along the connecting guide path 47 into the branch line guide slot 46 until it finally loses engagement with the transfer arm, is picked up by a following pusher 31 on the branch line, engages the resetting arm 74 of the switch mechanism which returns the switch to main line position, and moves on down the branch line.

Since the power take-off unit 50 is located right at the transfer zone 12, very close and precise synchronization can be obtained between main line pushers, transfer arms and branch line pushers. No problems are encountered due to slack in any of the chains and carrier movement between main and branch lines is practically continuous.

Referring now to FIGS. 1 and 5–8, the loading transfer zone 14 includes a traffic control station 75 at which an approaching carrier on the branch line 26 is halted until a signal is received that an empty pusher is approaching on the main line. This arrangement is conventional, forming no part of the present invention, and hence has not been shown in detail.

Guide sprocket 36 at the transfer zone 14 is mounted for rotation on a vertical shaft 76, and a pair of transfer arms 78 and 79 are secured to the sprocket 36 and its hub 80 in a manner similar to the construction employed on the drive sprocket 34 previously described. The transfer arms 78 and 79 continuously rotate in a circular horizontal path which overlies a portion of the path of the branch line and which is almost tangent to the adjacent side of the main line chain 17 and guide slot 24 as best shown in FIGS. 5 and 6.

The transfer arms 78 and 79 are positioned relative to pushers 31 on the branch propelling chain 29 so as to pass through the transfer zone in trailing relation to a pusher. Due to slack chain that may be present in either the main or the branch line between the unloading and loading transfer zones 12 and 14, there is no precise synchronization at the loading transfer zone 14 between the transfer arms 78 and 79 and main line pushers. Any possibility of a jam between the tow pin 23 of a carrier being transferred and an approaching main line pusher due to this lack of synchronization is eliminated by the provision of means for vertically relatively displacing the carrier driven member and a pusher of the receiving main line vertically to a position of clearance at the intersection of the receiving line and connecting path of travel. This means comprises a ramp member 82 shown in FIGS. 5–8, which is mounted beneath the last portion of the guide slot 49, extending from a leading edge 83, located below the bottom of a fully lowered tow pin 23, gradually upward, the trailing end 84 of the ramp member resting on the upper flange of a channel member of the main trackway 16 as shown in FIGS. 7 and 8. Trailing end 84 of the ramp member terminates just within the circular path of the transfer arms 78 and 79 and short of the main line guide slot 24 as shown in FIG. 5.

The connecting guide slot portion 49 diverges laterally from the path of travel of the branch line chain 29 around the guide sprocket 36 and gradually merges with the main line guide slot 24 to define a smooth gradual entry path. A notch 86 (FIG. 8) in a track member of the branch trackway 39 provides a passage for lateral movement of a tow pin 23 into the connecting guide slot portion. A tow pin of a truck being transferred approaches on the guide slot portion 46 (FIG. 5), and moves laterally through the passage 86 until driving engagement with a branch line pusher is lost. A following transfer arm 78 or 79 almost immediately engages the tow pin and advances it along the connecting guide slot portion 49. During this movement of the tow pin the lower face 88 thereof comes into engagement with the upper surface of the ramp 82, and since the tow pin 23 is mounted on the carrier for free vertical movement in the conventional manner, the tow pin rises, finally dropping off the bevelled trailing edge 84 of the ramp 82 into the path of an approaching main line pusher whose laterally extending wing 68 catches the tow pin and moves it on down the main line guide slot 24.

FIGS. 9–11 illustrate the invention as applied to an unloading transfer zone between a main power line 90 and a branch power line 91 of an overhead power-and-free conveyor. The main power line 90 includes an I-beam track 92 for trolleys 93 which support an endless chain 94 equipped with the depending pushers 95, and a drive unit (not shown) propels the chain in the direction of the arrow 96. A load supporting track 97 is mounted beneath the power track 92, the load track consisting of a pair of facing channel members suspended by hangers 99 as shown in FIG. 10. A load carrier includes at least one trolley 98 supported by the track 97 and provided with upwardly projecting driving and holdback dogs 100 and 101 which trap a pusher 95 in the usual manner.

The branch power line 91 is similar in construction to the main power line, including an I-beam track 103, trolleys 104, an endless chain 105 and pushers 106. At the transfer zone, the track 103 has a U-shaped curve portion 108 and the chain 105 engages and drives a sporcket 110 which is rotatably mounted on an axle 111 supported by suitable frame structure 112 at the center of the curve 108.

A double channel load supporting track 114 is mounted under the branch power track 103 by hangers 107 and connects with the load track 97 of the main line through a connecting portion 115 which, as shown in FIG. 9, extends around center of the sprocket at a greater radius than does the branch power track 103 and then converges at portion 116 into vertically aligned relation with the branch power track 103. The inner rail of the connecting track portion 115 is suspended from a beam 109 mounted between the track hangers 99 and 107 of the main and branch lines which are adjacent the transfer zone; special hangers 113 support the outer rail (see FIG. 14) from the branch track 103. Movement of a carrier onto the connecting track portion 115 is controlled by a conventional tongue switch 117.

It will be assumed that the branch power line is independently driven by a separate drive unit (not shown) so that there is no synchronization between the rate of movement or relative position of pushers 95 on the main line and pushers 106 on the branch line.

The sprocket 110 is provided with any desired number of transfer arms, three arms 118, 119 and 120 being used in the construction shown. Each arm includes a collar 122 pivotally mounted on a pin 123 secured to the sporcket, the collar being dimensioned so that the arm is positioned at the elevation for engagement with the driving dog 100 of a load trolley. A spring 124 normally holds the inner end 125 of each arm in a driving position against an abutment 126. The outer end of each arm is provided with a driving face 128 extending generally radial to the center of the axle 111.

The sprocket 110 and its transfer arms continuously rotate with movement of the driven branch power chain and the outer ends 130 of the transfer arms describe a circular path 131 which is tangent to the path of travel of the main line chain 94 and pushers 95 and which overlies the connecting load supporting trackway 115. When the switch 117 is in branch line position as shown in FIG. 9, a load trolley 98 approaching the transfer zone under propulsion by a pusher 95 engaging the drive dog 100 is diverted from the main path of travel under power until the pusher 95 disengages from the laterally moving drive dog 100 at the position indicated in FIG. 9. In this position the drive dog 100 overlaps the path of travel of one of the transfer arms, will be engaged thereby, moved along the connecting trackway 115 by the transfer arm and left in the path of travel of a branch line pusher 106.

In the event a transfer arm engages the side of a drive dog 100, a jamming condition will not result but instead the transfer arm will merely pivot away from the abutment 126 and move on, leaving the drive dog to be picked up by the next following transfer arm. This action is progressively illustrated by the full line and broken line positions of the transfer arm 118 and drive dog 100 in FIG. 11.

FIGS. 12–14 illustrate a loading transfer zone of an overhead power-and-free conveyor for returning a carrier from the branch line of FIGS. 9–11 to the main line. Identical reference numerals have been used for all similar parts.

The sprocket 138, which engages and is continuously driven by the branch line chain 105, is equipped with three transfer arms 140, 141 and 142. Each transfer arm is connected to the sprocket by bolts 144 and extends downwardly and outwardly so that the outer ends 145 of the arms describe a circular path 146 which is tangent to the path of travel of the main line chain and pushers and which overlies the connecting section 148 of the load supporting track. As shown in FIG. 12, this connecting section 148 diverges laterally at 149 from the path of the branch line power track 103 and extends around the sprocket 138 at a greater distance from the axle 111 than does the power track 103.

A load carrying trolley, approaching the transfer zone propelled by a pusher 106 of the branch line may be halted in advance of the transfer zone by a traffic control device 150 to await the approach of an empty pusher on the main line. When the load carrying trolley does proceed into the transfer zone, the trolley driving dog 100 loses engagement with a forwarding branch line pusher 106 as the trolley passes over the connecting track portion 149. The trolley is then engaged by one of the transfer arms and driven around the connecting track 148 into the path of an approaching main line pusher. In order to eliminate any possibility of a destructive jamming condition resulting from a trolley dog being fed into the side of a main line pusher, the main line power track 92 is formed with a short section 152 (FIG. 12) at the zone of convergence between a main line pusher and the dogs of a trolley being transferred, which is elevated to reduce the over-lapping engagement between a main line pusher 95 and a trolley driving dog 100, as shown in FIG. 13. Along the elevated track section 152, the amount of overlap of a pusher 95 and driving dog is sufficient for driving engagement under normal conditions, but small enough so that under a jamming condition a pusher can move up and ride over the driving dog, such movement being permitted by the clearance between the wheels of the trolley 93 and upper flange of the track 152 as indicated by the reference 155. Track section 152 is preceded by a quick rise section 153 in the main line power track and followed by a quick drop section 154 which lowers a main line pusher into normal driving relation with a trolley just as the latter loses engagement with a transfer arm.

Those skilled in the art will readily appreciate that the various transfer constructions disclosed and described herein are applicable to either floor truck tow line conveyors or overhead power-and-free conveyors even though each of them have been illustrated in one particular setting. In the claims which follow, the term "driven member" should be considered as descriptive of either a drive pin of a floor truck or drive dog of a load carrying trolley; the term "carrier' as descriptive of either a floor truck or a load carrying trolley; and the phrase "guide members for defining a connecting path of travel" as describing either floor plates provided with a slot for guiding a drive pin, tracks for guiding a floor truck tow mast, or tracks for supporting and guiding a load carrying trolley.

From the foregoing it will be seen that the invention provides a comparatively simple and advantageous construction for a conveyor incorporating main and branch lines with transfer zones therebetween. The components employed on main and branch lines are conventional and standardized, and the transfer arms employed to shift a carrier from one line to another are simple and positive in operation. Where a transfer zone is desired at which a carrier is unloaded from the main line, this operation may be accomplished with positive synchronization of the pusher members and transfer arms with the combined advantage of incorporating drive to the branch line through a power take-off unit rather than powering the branch line with a separate drive unit; or, this operation may be accomplished without synchronization. At a transfer zone where a carrier is loaded onto the main line from a branch line the operation is equally simple with no provision for synchronization between main and branch line pushers being necessary.

While preferred embodiments have been described above in detail, it will be understood that numerous modifications might be resorted to without departing from the scope of the invention as defined in the following claims.

I claim:

1. A conveyor including main and branch lines each having an endless propelling member supported by trolleys on a trackway and pushers for engaging a driven member of a carrier travelling on a support adjacent the trackway and means for transferring a carrier between the main and branch lines at a transfer zone, characterized by a transfer arm mounted for rotation on a vertical axis at the transfer zone, means for continuously driving the transfer arm from the propelling member of one of the main and branch lines with the outer end of the transfer arm following a horizontal circular path which is tangent to the path of travel of the main propelling member and which overlaps a portion of the path of travel of the branch propelling member, and guide members defining a connecting path of travel of the carrier driven member through the transfer zone from one line to the other, the end portions of this connecting path of travel overlapping the path of travel of pushers on the main and branch lines and the remaining portion of the connecting path of travel lying within the circular path of the transfer arm.

2. A conveyor as claimed in claim 1 further characterized by the means for continuously driving the transfer arm including a sprocket about which the branch line propelling member is trained, and means connecting the transfer arm to the sprocket for rotation therewith.

3. A conveyor as claimed in claim 2 further characterized by the means for continuously driving the transfer arm including a power take-off unit engaging the main propelling member adjacent the transfer zone for transmitting motion to said sprocket whereby movement of the transfer arm is synchronized with movement of pushers on both the main line and the branch line.

4. A conveyor as claimed in claim 2 further characterized by the means connecting the transfer arm to the sprocket including a pin on which the transfer arm is mounted for pivotal movement on an axis parallel to the axis of transfer arm rotation, an abutment carried by the sprocket, and means normally urging the transfer arm to a driving position in engagement with the abutment.

5. A conveyor as claimed in claim 1 further characterized by means for relatively displacing a carrier driven member and a pusher on the receiving propelling line vertically at the intersection of the receiving propelling line and connecting path of travel.

6. A conveyor as claimed in claim 5 wherein the means for relatively displacing a carrier driven member and a pusher comprises a ramp along at least a portion of the connecting path of travel for moving a driven member vertically to a position of clearance with a pusher on the receiving propelling member during travel of the carrier driven member along the connecting path of travel.

7. A conveyor as claimed in claim 5 wherein the means for relatively displacing a carrier driven member and a pusher comprises a section of track on the receiving power line, said section being elevated above the normal level of the receiving power track for moving a receiving pusher vertically.

8. A conveyor as claimed in claim 1 further characterized by the main line pushers each having a laterally extending portion which overlaps the circular path of the transfer arm.

9. A conveyor transfer device for moving a carrier having a driven member along a connecting path between main and branch line propelling members comprising a sprocket having a hub portion and teeth means for engaging the branch line propelling member at a certain radius from said hub portion; a transfer arm secured to said sprocket for rotation therewith and extending outwardly of said teeth means in vertically spaced relation therewith; and axle means mounting said hub portion for rotation on a vertical axis adjacent to the main line propelling member and to said connecting path so that the circular path described by the outer end of said transfer arm is almost tangent to the main line and overlaps said connecting path.

10. A conveyor transfer device as claimed in claim 9 wherein said connecting path includes end portions which overlap the path of travel of the main and branch line propelling members and an intermediate portion formed as an arc about the axis of rotation of said sprocket on a radius greater than that of the sprocket.

11. A conveyor transfer device for moving a carrier having a driven member along a connecting path between main and branch line propelling members comprising a transfer arm, means mounting the transfer arm for rotation on a vertical axis, means for continuously driving the transfer arm from one of the propelling members whereby the outer end of said transfer arm describes a circular path which is almost tangent to the main line, the end portions of said connecting path overlapping the path of travel of the main and branch line propelling members and the remaining portion of said connecting path lying within the circular path of said transfer arm.

12. A conveyor transfer device as claimed in claim 11 wherein the said remaining portion of said connecting path is formed as an arc about the center of the circular path of travel of said transfer arm.

13. A conveyor transfer device as claimed in claim 11 further characterized by one end portion of said connecting path being defined in part by a deflector, and means mounting the deflector for movement between main and branch line portions.

14. A conveyor transfer device as claimed in claim 11 wherein the means for continuously driving the transfer arm includes a sprocket engaging and driven by the branch line propelling member.

15. A conveyor transfer device as claimed in claim 11 wherein the means mounting the transfer arm permit movement thereof inwardly of said circular path in response to misengagement of the transfer arm with a carrier.

References Cited by the Examiner

UNITED STATES PATENTS

| | | | |
|---|---|---|---|
| 2,688,935 | 9/54 | Brooks | 104—104 |
| 2,688,936 | 9/54 | Brooks | 104—104 |
| 2,868,139 | 1/59 | Klamp | 104—88 |
| 2,875,704 | 3/59 | Yates | 104—96 |
| 3,048,125 | 8/62 | Burrows | 104—172 |
| 3,056,360 | 10/62 | Burmeister et al. | 104—96 |

EUGENE G. BOTZ, *Primary Examiner.*

LEO QUACKENBUSH, *Examiner.*